Figure 1:
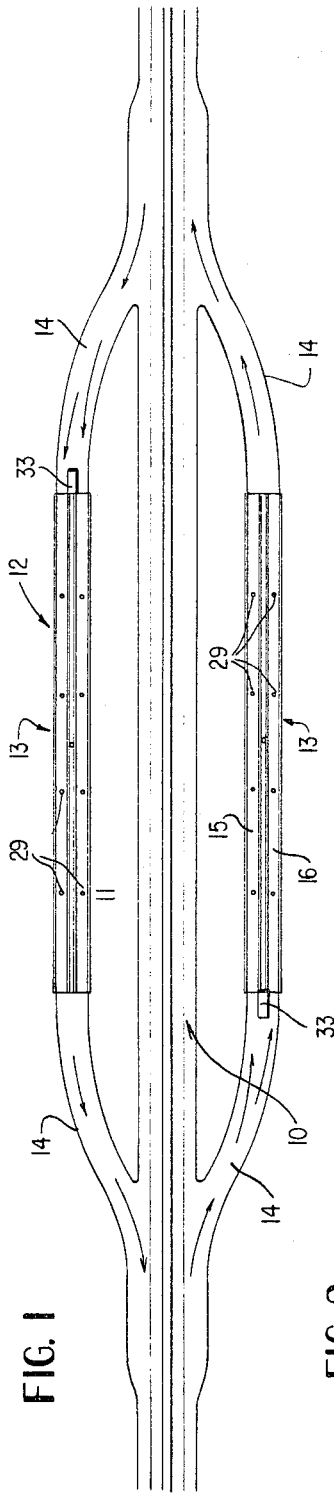

Aug. 30, 1966  C. L. CARTER  3,269,281
VEHICLE TIRE COOLING STATIONS FOR HIGHWAYS
Filed Feb. 6, 1964  2 Sheets-Sheet 1

INVENTOR.
CLARENCE L. CARTER
BY
B. P. Fishburne, Jr.
ATTORNEY

Aug. 30, 1966  C. L. CARTER  3,269,281
VEHICLE TIRE COOLING STATIONS FOR HIGHWAYS
Filed Feb. 6, 1964  2 Sheets-Sheet 2

INVENTOR.
CLARENCE L. CARTER
BY
*B. P. Fishburn, Jr.*
ATTORNEY

United States Patent Office 3,269,281
Patented August 30, 1966

3,269,281
VEHICLE TIRE COOLING STATIONS
FOR HIGHWAYS
Clarence L. Carter, P.O. Box 5A, Fort Lawn, S.C.
Filed Feb. 6, 1964, Ser. No. 342,970
1 Claim. (Cl. 94—1)

This invention relates to improvements in highways and more particularly to vehicle tire cooling stations for highways.

Sustained high-speed driving on modern limited access highways and turnpikes, particularly in the summer months, has created a serious problem in connection with the overheating of automobile and truck tires. The problem becomes more critical when tires are somewhat worn and when vehicles are overloaded with freight or passengers. Many accidents are occasioned by tire failure or blow-outs, due at least in part to excessive tire temperature and increase in tire pressure caused by overheating. Trucks and automobiles frequently travel for hours on highways and trunpikes at sustained speeds of seventy miles per hour or more, and as any observant driver knows from experience, the vehicle tires frequently become alarmingly and dangerously hot. Even new tires may fail suddenly under these conditions, and older or worn tires are much more likely to fail or blow out, causing serious property damage, personal injury or loss of life.

Accordingly, the object of this invention is to provide at desirable intervals, particularly along limited access highways and turnpikes, readily accessible tire cooling stations, where automobiles and trucks, after the payment of a small toll fee, may drive their vehicles slowly through troughs of cool running water for a sufficient distance to effectively and drastically cool the tires before returning to the highway for normal driving speeds. The use of the tire cooling stations proposed by this invention will result in only a negligible loss of time for the highway traveler, which is much more than offset by the gain in safety and peace of mind resulting from the use of the invention. The invention may be readily installed on existing highways or turnpikes, or may be incorporated in new highways at the time of their construction. The cost of the invention and its operation may be easily offset and a profit may be reaped, if desired, by the payment of a very small toll fee.

Means are provided according to the invention to continuously supply cool running water to a pair of parallel troughs or vats designed to accommodate passenger automobiles on the one hand and trucks and buses and the like on the other hand. An overflow trough leading to a drain culvert is provided between the pair of troughs which make up each tire cooling station. Means are also provided to drain and flush each trough for removing sediment therefrom whenever this is necessary. The construction of the tire cooling station is simple, economical and entirely practical. Upkeep or maintenance after construction is negligible and the advantages obtained by the use of the invention will result in the saving of a great deal of money by even a small reduction annually of the tragic highway accidents which occur in this country.

The invention is applicable to divided highways of all types including limited access highways and turnpikes, and it is also applicable to undivided highways including multiple lane highways which include no median strip. Units of the invention may be provided in pairs at desired intervals on opposite sides of a highway or single units may be provided on alternate sides of a highway at desired intervals.

Other objects and advantages of the invention will become apparent during the course of the following detailed description.

Figure 2:
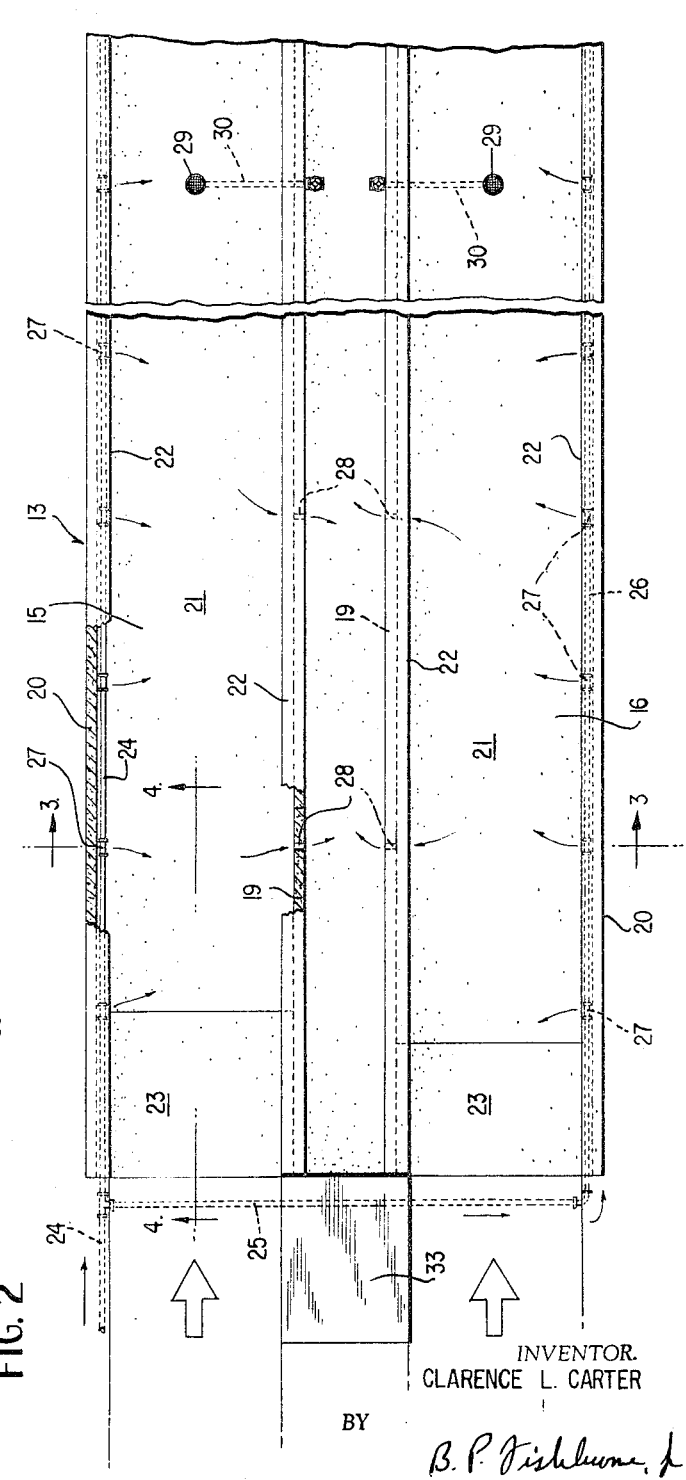
Figure 3:
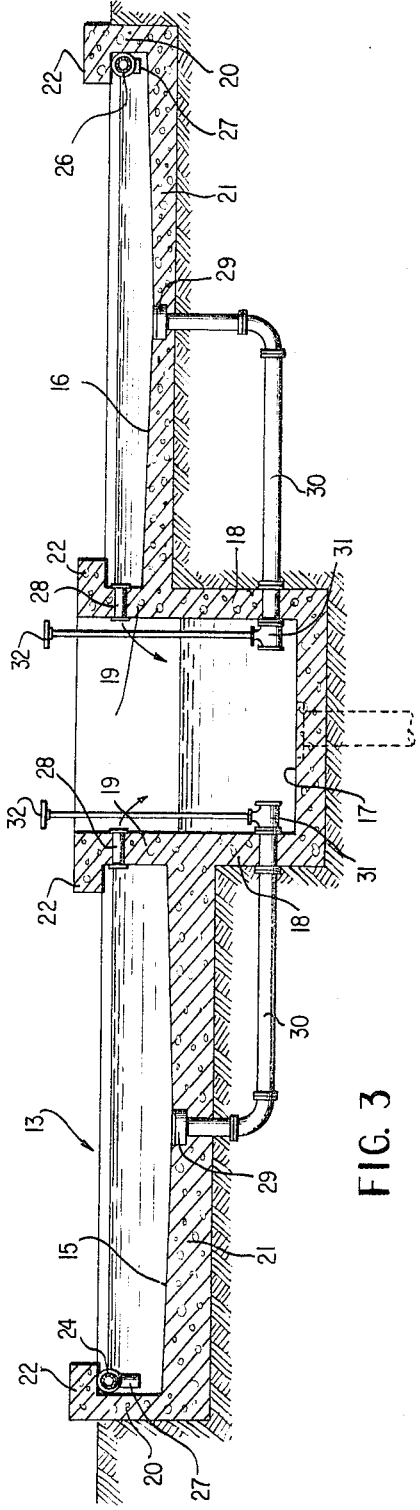
Figure 4:
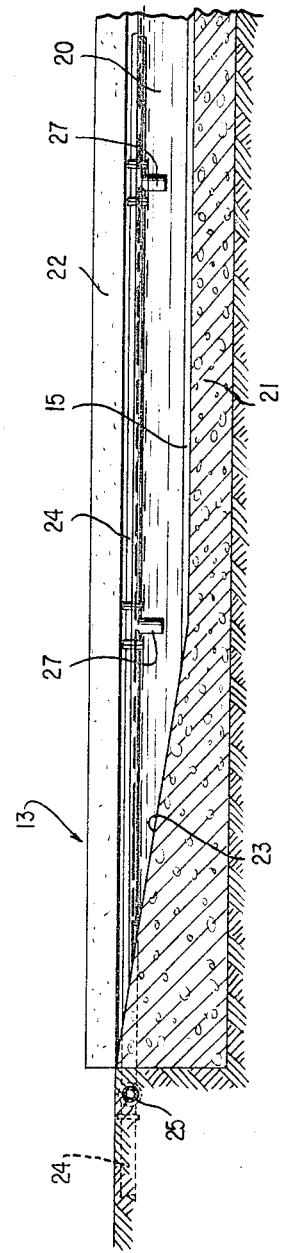

In the accompanying drawings, forming a part of this application and in which like numerals are employed to designate like parts throughout the same, FIGURE 1 is a diagrammatic plan view of a divided highway having a dual unit of the invention installed therein for cooling the tires of vehicles traveling in either direction upon the highway, FIGURE 2 is an enlarged fragmentary plan view of one unit of the invention shown in FIGURE 1, partly in section and partly broken away, FIGURE 3 is an enlarged transverse vertical section taken on line 3—3 of FIGURE 2, and FIGURE 4 is an enlarged fragmentary longitudinal vertical section taken on line 4—4 of FIGURE 2.

In the drawings, wherein for the purpose of illustration is shown a preferred embodiment of the invention, attention is directed first to FIGURE 1, wherein the numeral 10 designates a short section of a divided multiple lane highway or turnpike having a median strip 11. A tire cooling station 12 embodying the invention includes companion identical units 13 disposed upon opposite sides of the highway 10 and connected therewith by paved access ramps 14, similar to the access ramps which commonly lead to and from roadside restaurants, gasoline stations and like facilities. Each unit 13 of the invention, whether a dual unit station or a single unit station, is identical in construction to other units, and therefore a description of a single unit will suffice to fully describe the invention. It has already been pointed out that the invention may be constructed in dual units as shown in FIGURE 1 or in single units along either side of a divided or undivided highway.

FIGURES 2-4 of the drawings show the details of construction of one of the units 13 of the dual tire cooling station 12 in FIGURE 1. In these figures, the single invention unit 13 illustrated is preferably about 500 feet long, exclusive of the length of the access and exit ramps 14 leading from and into the highway 10 and connected with the opposite ends of the unit 13. The unit 13 is constructed from concrete, suitably reinforced, and comprises first and second cooling troughs or vats 15 and 16, each about twelve feet wide from side wall to side wall, the trough 15 being somewhat deeper than the trough 16, for accommodating the larger tires of trailer trucks, buses and the like. The more shallow trough 16 is intended to accommodate passenger vehicles or other like vehicles having smaller tires. It is immaterial to the invention as to which side of the unit 13 contains the deeper or shallower cooling trough. This will be in accordance with Federal or State highway regulations dictating the particular lane or side of the highway reserved for passenger vehicles or for trucks and buses.

Intermediate the spaced parallel cooling troughs 15 and 16 formed integral therewith is a relatively narrower and somewhat deeper drain trough 17, which extends for the entire length of the unit 13 or tire cooling station. The side walls 18 of the common drain trough 17 extend upwardly, FIGURE 3, and form the inner side walls 19 of the companion cooling troughs 15 and 16. The troughs 15 and 16 have separately formed outer side walls 20 extending above and formed integral with their bottom slabs 21. Overhanging ledges or curbs 22 are preferably formed atop the side walls 19 and 20 to conceal and protect certain supply lines and fittings presently to be described. The tire cooling station and each of its units 13 is recessed in the ground for the easy entrance and exit of vehicles passing to and from it on the ramps 14, which ramps are normally at the level of the main highway 10. FIGURE 4, at 23, depicts one of the gradually sloping entrance ramps to the unit 13, leading downwardly from the adjacent access ramp 14, not shown in FIGURE 4. An identical exit ramp from the trough 15, not shown in FIGURE 4, is provided at the opposite end of the invention unit. The exact length of each inclined ramp 23 is not a critical factor and may be varied somewhat within the scope of the invention. Neither is the exact overall length of the invention unit a critical factor, and while 500 feet is a preferred length, this distance may be varied somewhat as found desirable.

Fresh cool water from any convenient source not shown is supplied to each unit 13 by a pipe 24, leading from a pump. A sub-surface branch pipe 25 near one end of the unit 13 leads from the pipe 24 to another pipe 26 at the opposite side of the unit 13. As shown in the drawings, the supply pipes 24 and 26 are preferably mounted beneath the outermost overhanging ledges 22 and are supported thereunder in any convenient manner. At spaced intervals therealong, the supply pipes 24 and 26 have depending water inlets 27 which carry the water directly into the troughs 15 and 16 continuously.

At spaced intervals along the interior side walls 19, and close to and beneath the adjacent ledges 22, drain or overflow tubes 28 are contained in the walls 19, to continuously regulate the level of the water within the two troughs 15 and 16. From these overflow tubes 28, the water in the troughs 15 and 16 continuously empties into the drain trough 17. The trough 17 preferably slopes gradually from its ends toward its longitudinal center, and at this point, the water may drain into a central drain culvert not shown in the drawings. The interval spacing of the drain tubes 28 and the inlets 27 is not extremely critical and may be varied somewhat according to the invention. As an example, the inlets 27 may be spaced apart ten feet on centers, and the drain tubes 28 may be spaced apart 20 feet on centers.

As shown in FIGURE 3, the troughs 15 and 16 preferably have their bottom slabs 21 sloping somewhat from their outer sides to the transverse center of each trough. This sloping is uniform throughout the entire lengths of the troughs 15 and 16. At intervals along the troughs 15 and 16, such as every 100 feet, mud and silt drains 29 are suitably installed in the bottom slabs 21 at their transverse centers. These drains 29 connect with subsurface drain pipes 30 which in turn connect into the central drain trough 17 near the bottom thereof and through the side walls 18, as shown. Manually operated drain valves 31 are mounted upon the outlet ends of the drain pipes 30 in the trough 17, and these valves have handles 32, readily accessible near the top of the main trough 17. The valves 31 are periodically opened for the flushing and cleaning of mud and silt and other debris from the cooling troughs 15 and 16. Such material is flushed into the drain trough 17 and then into the main drain culvert, not shown, at the longitudinal center of the trough 17.

During normal operation, the valves 31 are maintained closed and fresh cooling water is pumped through the pipe 24, branch pipe 25 and the opposite inlet pipe 26. Such water enters the troughs 15 and 16 from the multiple inlets 27 and the level of cooling water within the troughs is maintained by the overflow tubes 28 in the manner depicted in FIGURE 3. In this way, the temperature of the water in the system is maintained cool at all times so that the tires of vehicles passing slowly through the troughs 15 and 16 will have their temperatures materially reduced for the purpose of safety.

The operation of the invention is substantially obvious in light of the foregoing description. Passenger cars, trucks, buses and other vehicles are advised by suitable signs along the highway 10 that they are approaching a tire cooling station 12. The use of these stations can be made voluntary or compulsory as determined by Federal law or the laws of a state. The vehicles reduce their speed when approaching the station 12 and enter the station by way of the approach ramps 14. The vehicles stop momentarily to pay their toll at a suitable booth 33 at the entrance end of each unit 13, between the truck and passenger car troughs 15 and 16. After stopping momentarily, the vehicles slowly enter the troughs 15 and 16 and travel at a slow rate of speed, such as five or ten miles an hour, for the entire length of the cooling station and then emerge from the exit end of the station and pass back onto the highway 10 via the exit ramps 14 and then resume normal highway speeds. In this manner, the tires of vehicles are periodically cooled to safe levels and tire failures are greatly reduced, thereby reducing to a significant extent the number of accidents caused by tire overheating.

It is to be understood that the form of the invention herewith shown and described is to be taken as a preferred example of the same, and that various changes in the shape, size and arrangement of parts may be restored to, without departing from the spirit of the invention or scope of the subjoined claim.

Having thus described my invention, I claim:

A vehicle tire cooling station positioned along the side of a roadway comprising a pair of elongated laterally spaced substantially parallel tire cooling troughs of sufficient length to thoroughly cool a tire rolling therethrough, each trough of sufficient width to receive the four wheels of an automotive type vehicle and of sufficient depth to substantially submerge the lower sides of tires rolling therethrough, one trough being materially deeper than the other trough to facilitate cooling tires of larger size, a common drain trough between said pair of tire cooling troughs and being substantially narrower than the tire cooling trough and of a greater depth and having its bottom wall spaced below the bottoms of the tire cooling troughs, said common drain trough communicating with a subterranean drain means, cooling water supply pipes extending longitudinally along the interior faces of the outer side walls of the tire cooling troughs and having longitudinally spaced water outlets to continuously supply fresh water to the tire cooling troughs adjacent their outer sides, longitudinally spaced drain tubes mounted within the interior side walls of the tire cooling troughs and communicating with said common drain trough and allowing water to continuously drain from the tire cooling troughs into the common drain trough and also maintaining a constant water level in each tire cooling trough near the top thereof, flushing drains in the bottoms of the tire cooling troughs substantially at their transverse centers, each tire cooling trough having its bottom wall sloping downwardly somewhat from the sides of the trough toward the transverse center thereof, drain pipes leading from said flushing drains and through the side walls of the common drain trough below the bottom walls of the tire cooling troughs and into the common drain trough, whereby sediment can be drained and flushed periodically from the tire cooling troughs into the common drain trough, manual valves connected in said drain pipes adjacent the sides of the common drain trough, horizontal longitudinal protective ledges on the tops of the inner and outer side walls of said tire cooling troughs and extending inwardly of said side walls in close overlying relation to the supply pipes and water outlets and said drain tubes so as to protect the same from engagement with the wheels of vehicles passing through the tire cooling troughs, and access ramps at opposite ends of said cooling troughs communicating with said roadway.

References Cited by the Examiner

UNITED STATES PATENTS

| | | | |
|---|---|---|---|
| 332,761 | 12/1885 | Taylor | 94—32 |
| 987,542 | 3/1911 | Booream | 94—31 X |

FOREIGN PATENTS 935,192  2/1948  France.

JACOB L. NACKENOFF, *Primary Examiner.*